Patented Nov. 2, 1926.

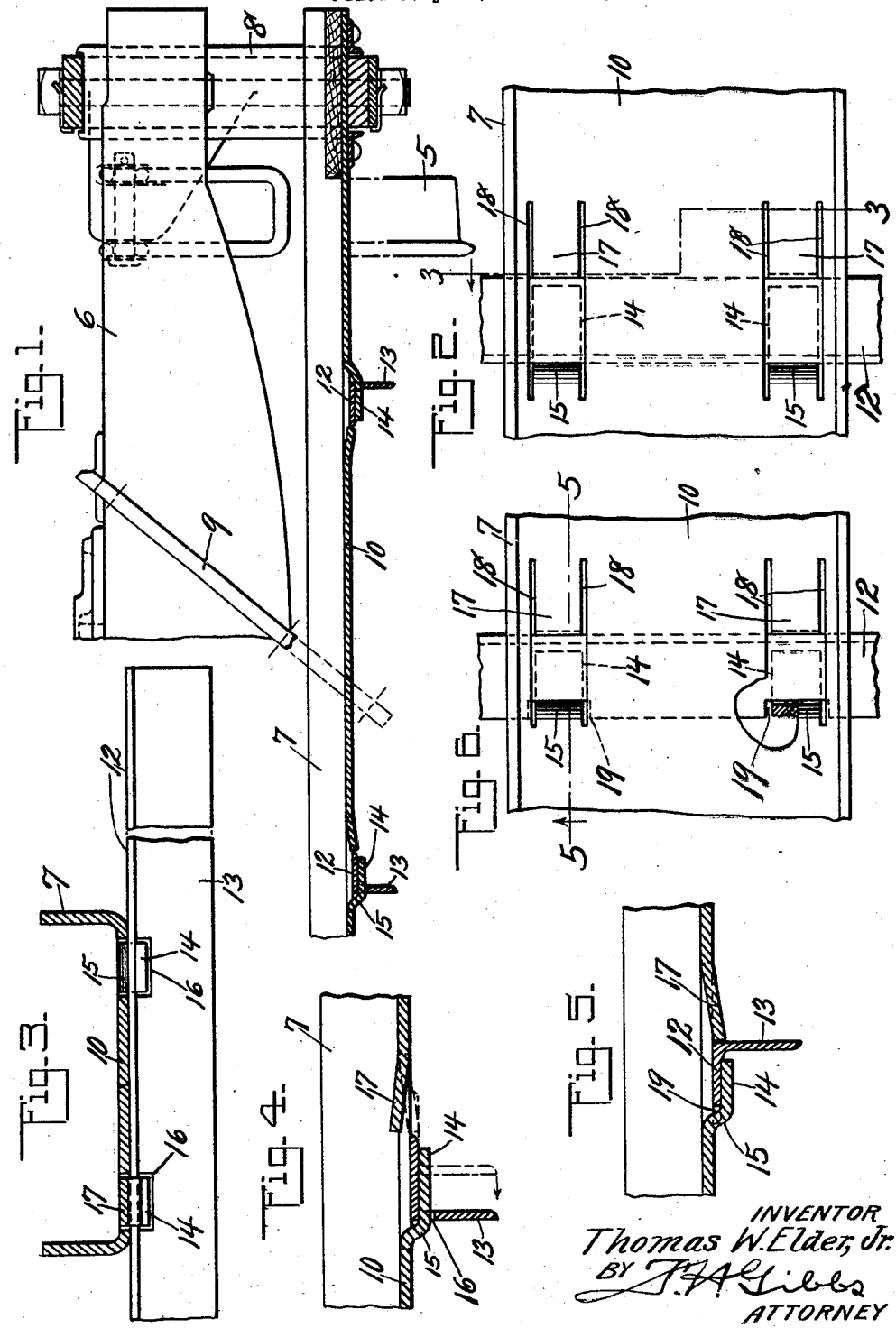

1,605,397

UNITED STATES PATENT OFFICE.

THOMAS W. ELDER, JR., OF BROOKLYN, NEW YORK, ASSIGNOR TO AMERICAN CAR AND FOUNDRY COMPANY, OF NEW YORK, N. Y., A CORPORATION OF NEW JERSEY.

BRAKE-BEAM SUPPORT.

Application filed July 12, 1926. Serial No. 121,956.

This invention relates to improvements in brake beam supports, reference being had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Fig. 1 is a fragmentary view of parts of a truck frame as seen with the truck "end on", the "spring plank" being shown in longitudinal section through the securing means for the brake beam supports, and the supports in cross-section;

Fig. 2 is a fragmentary plan view of portions of the spring plank and a brake beam support;

Fig. 3 shows a cross-section through the spring plank adjacent one of the supports, taken as indicated by the line 3—3 in Fig. 2, the support being shown partly broken away;

Fig. 4 is a fragmentary sectional view of the spring plank and a support, similar to Fig. 1 but on a larger scale, illustrating the installation or removal of a support;

Fig. 5 is a view similar to Fig. 4 but showing a somewhat different relation of the parts, the section being taken as indicated by the line 5—5 in Fig. 6;

Fig. 6 is a fragmentary plan view, similar to Fig. 2 but showing the construction illustrated in Fig. 5, with a portion of the spring plank broken away and in section at the securing means for the support.

My invention relates to brake beam supports and their mounting, and particularly emergency or safety supports (as they are termed), for preventing brake beams which may get loose from falling to the railway track and causing accidents. I aim not only to mount the emergency support in such a way that it will be secure when properly fastened, but also to guard against its being carelessly left insecurely fastened. In the form of embodiment here shown and described, my invention is in some aspects in the nature of an improvement of the construction shown and described in U. S. Patent No. 1,405,429, Feb. 7th, 1922, to A. E. Ostrander. In this embodiment, my invention offers the further advantage that the final securing of the support can be effected very easily and quickly, without any special tools or equipment.

The parts of the truck shown in the drawings include the car wheel 5, the truck bolster 6, the spring plank 7, the bolster column 8, and the brake lever 9. In the present instance, the spring plank 7 is of channel construction, with horizontal web 10 and upstanding flanges. The safety or emergency brake beam supports 12, 12 carried by the spring plank 7 project to either side thereof in position to sustain the brake beams (not shown) in case of accident to the brake rigging (not shown). Each of these supports 12, 12 may consist of an angle bar arranged with one flange flat against the lower side of the spring plank 7, and the other flange 13 turned downward. For the purpose of mounting the supports 12, 12, there are lugs or tongues 14 attached to the spring plank 7, offset laterally below its lower surface in parallelism therewith.

The supports 12, 12 have their horizontal flanges engaged between the corresponding tongues 14 and the lower surface of the web 10. Such a tongue 14 may be formed integral with the spring plank web 10, by cutting or punching a portion thereof free along three sides and bending or joggling it outward adjacent its remaining attachment or "root," as shown at 15 in Figs. 1 and 4. In Figs. 2 and 3, two tongues 14, 14 are shown for each of the supports 12, 12.

As shown in the drawings, each tongue 14 not only engages the corresponding support 12 as above described, but also penetrates it, through an opening 16 slotted at the base of the depending angle bar flange 13. By its engagement in the opening 16, the tongue 14 prevents the support 12 from shifting in the direction of its own length, transversely of the spring plank 7. As here shown, each angle bar 12 "faces" away from the attached end 15 of each tongue 14 associated with it, so that the tongue penetrates the flange 13 near its own point of attachment.

Disengagement of a support 12 from the corresponding tongues 14, 14 may be prevented by displacing a portion of the plank web 10 laterally, so as to engage the support 12 at one side. As shown in Figs. 1 and 4, the securing means thus provided is entirely separate from the tongue 14, consisting of another tongue 17 located directly opposite the tongue 14 and formed in a similar manner. This tongue 17 is bent downward below the web 10 so as to bring its free end or edge opposite and against the corresponding edge of the horizontal flange of the support 12. As a matter of convenience and economy in manufacture, the tongues 14 and 17 may be formed directly opposite and contiguous to one another, by severing transversely a strip of the web 10 included between parallel slots 18, 18. This will readily be understood from a comparison of Figs. 1, 2, and 4.

The lateral bending of the tongue 17 to secure or lock the support 12 as described is done, of course, after the support 12 has been put in position and pushed home to the roots of the tongues 14, 14: when the support 12 is inserted in position, the tongue 17 may either be in the plane of the web 10 or may be bent sufficiently to either side thereof to obviate interference with the necessary movement of the support 12. Fig. 4 shows the tongue 17 bent upward slightly from the plane of the web 10 to assure its clearing the member 12 amply. After the support 12 is in place, as shown in full lines in Fig. 4, the tongue 17 may be bent down into the dotted line position of Fig. 4 by a couple of blows with a hammer from above.

Not only is such a mode of securing a support 12 against disengagement, by means of a portion of the spring plank web 10, very effective and reliable in itself, but it also minimizes the danger of a support being left without proper fastening; because when a support 12 is engaged with the tongues 14, 14 and pushed home in the manner indicated in Fig. 4, the entire absence of anything to prevent its disengagement by a simple reverse movement is so obtrusively obvious that the workman is not at all likely to neglect bending down the ends of the tongues 17, 17 as above described. In the bolt-secured construction shown in the above-mentioned Ostrander Patent No. 1,405,429, on the other hand,—where a couple of bolts through support and plank web are relied on to secure the support against disengagement,—it occasionally happens that the nuts are carelessly left off the bolts, which are then very likely to be jolted out of their holes when the car is in service, and thus allow the support to become disengaged. Such failure to put the nuts on seems to be largely induced by the fact that the mere presence of the bolts in their holes does really,—so long as they remain there,—prevent disengagement of the support. In the construction here shown, however, there is no such misleading appearance of securing the support without a reliable permanent fastening.

The construction shown in Figs. 5 and 6 differs from that of Figs. 1-4 in that the angle bar support 12 "faces" towards the roots 15 of the tongues 14, 14, instead of away from them; also, the edge of the horizontal angle bar flange is slightly notched at 19, 19 to accommodate the roots of said tongues 14, 14 and engage around them. The engagement of the tongue portions 15, 15 in these notches 19, 19 secures the support 12 against lengthwise movement, transversely of the spring plank 7, without necessity for penetration of the depending flange 13 by the tongues 14, 14. In Figs. 5 and 6, various parts and features are marked with the same reference characters as in Figs. 1-4, as a means of dispensing with merely repetitive description.

What is claimed is:

1. The combination of a truck part having a web and a laterally offset tongue attached thereto, with a brake beam support engaged between said web and said tongue, and a portion of said web separate from said tongue displaced from the general plane of the web to secure the support against disengagement.

2. The combination of a truck part having a web and a laterally offset tongue attached thereto, with a brake beam support engaged between said part and said tongue, and a portion of said web opposite the free end of the tongue bent laterally to secure the support against disengagement.

3. The combination with a truck part and a laterally offset tongue attached thereto, of a brake beam support engaged between said part and said tongue and penetrated by the latter, and means separate from said tongue for securing said support against disengagement.

4. The combination with a truck part and a laterally offset tongue attached thereto, of a brake beam support engaged between said part and said tongue and penetrated by the latter, and a tongue formed from said web bent to engage the support at the side thereof away from the attachment of the first-mentioned tongue to the web.

5. The combination of a truck part having a web with opposed tongues formed and displaced laterally therefrom, and a brake beam support engaged between the web and one of said tongues, and secured against disengagement by the other tongue.

6. The combination with a truck part having a web and a laterally offset tongue formed from said web, of an angle bar brake beam support with one flange engaged between the web and said tongue and the other flange penetrated by the latter, and another tongue formed from said web with its end displaced laterally therefrom to engage said support at the side away from the root of the first tongue.

In witness whereof I have hereunto set my hand.

THOMAS W. ELDER, Jr.